United States Patent [19]

Wilson et al.

[11] 4,140,262
[45] Feb. 20, 1979

[54] SIZE-ADJUSTABLE INTERNAL PIPE CLAMP APPARATUS

[75] Inventors: Daniel F. Wilson; Calvin D. Scully, both of Houston, Tex.

[73] Assignee: Midcon Pipeline Equipment Co., Houston, Tex.

[21] Appl. No.: 787,795

[22] Filed: Apr. 15, 1977

[51] Int. Cl.² ............................................. B23K 37/04
[52] U.S. Cl. ..................................................... 228/49
[58] Field of Search .......................... 228/44.5, 49, 50; 269/43, 49; 29/272

[56] References Cited

U.S. PATENT DOCUMENTS

| 3,044,431 | 7/1962 | Cummings | 269/49 X |
| 3,425,614 | 2/1969 | Clark | 228/44.5 X |
| 3,462,059 | 8/1969 | Bauer et al. | 228/50 X |

*Primary Examiner*—Al Lawrence Smith
*Assistant Examiner*—K. J. Ramsey
*Attorney, Agent, or Firm*—Carl B. Fox, Jr.

[57] ABSTRACT

Size-adjustable internal pipe clamp apparatus, for use in two different nominal sizes of pipes, wherein adjustments are provided for all pipe contacting elements so that only a single apparatus need be provided for clamping abutted pipe ends of two sizes of pipes together for welding instead of the two separate and distinct apparatuses hereinbefore required.

12 Claims, 16 Drawing Figures

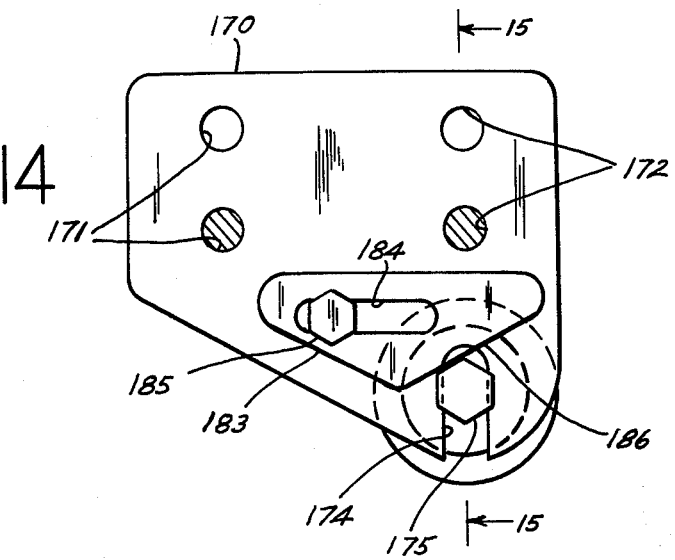
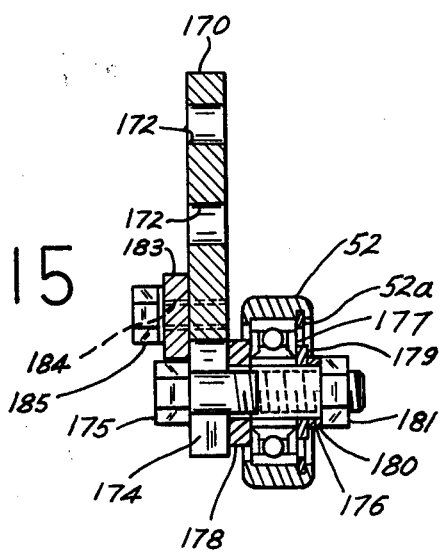

SIZE-ADJUSTABLE INTERNAL PIPE CLAMP APPARATUS

BACKGROUND OF THE INVENTION

In the welding of lengths of relatively large diameter pipe together it is necessary to clamp the pipe ends in order to hold the pipe ends in proper space relationship and in order to force the pipe ends to circular shapes, the clamps usually being applied internally of the pipes. Pipes of large diameter are rarely of true circular shapes, so that without the use of a clamping device it is difficult if not impossible to obtain a satisfactory weld connection between the ends of end-to-end sections of pipes.

Pipe clamps of the type required for this type of use are exceptionally heavily constructed and are expensive. Heretofore, it has been necessary to provide a pipe clamp apparatus for each nominal size of pipe, so that if a variety of different sizes of pipes are to be welded together end-to-end to pipes of the same size a large investment in pipe clamp apparatus is required. This invention provides a single pipe clamp apparatus which may be used with two nominal sizes of pipes, the result being that the investment in pipe clamp apparatus is substantially half what it would be using conventional pipe clamp apparatus.

SUMMARY OF THE INVENTION

The invention provides internal pipe line-up clamps which, distinct from the clamps of the prior art, are usuable with pipes of different diameters. The line-up clamp apparatus includes a pair of rings of expandable shoes, one ring of shoes being adaptable to be set or clamped within the end of one length of pipe and the other ring of shoes being adapted to be set or clamped within the end of another section of pipe to be welded to the first section of pipe. As in many forms of commercially known pipe clamp apparatuses, the shoes are expanded and retracted by the action of axially disposed cylinders connected by toggles to radial shafts on which the shoes are carried, one being provided for each ring of shoes and which are operated either hydraulically or pneumatically. The shoes are each mounted at the outer end of a separate radial shaft, and the shoe to shaft connections include novel adapters which may be reversed to alter the radial disposition of each shoe. The guide elements for introduction of the apparatus into a pipe and for stabilization of its passage through the pipe are adaptable to fit two different pipe sizes. The wheel supports and drive motor for the driven wheel or wheels are also adaptable to fit two different pipe sizes. These features make the apparatus of great economical and practical benefit, since one apparatus may be employed for the welding of pipes of two different nominal sizes, whereby a single rather than two apparatuses need be provided for the welding of two different nominal sizes of pipe end-to-end, and in addition there are savings resulting from economy of storage and transportation of the apparatus.

A principal object of the invention is to provide internal pipe line-up clamp apparatus usuable with two sizes of pipe. Another object of the invention is to provide such apparatus which is readily convertable from a condition for use with one size of pipe to a condition for use with another size of pipe. Still another object of the invention is to provide such apparatus which is simple in operation and design, and which is economical in manufacture and use.

Other objects and advantages of the invention will appear from the following detailed description of a preferred embodiment thereof, reference being made to the accompanying drawings.

BRIEF DESCRIPTIONS OF THE DRAWINGS

FIGS. 1A and 1B together are a side elevation of a preferred embodiment of apparatus according to the invention.

FIG. 14 is a side elevation of a modified locator wheel assembly.

FIG. 15 is a vertical cross section taken at line 15—15 of FIG. 14.

DESCRIPTION OF THE PREFERRED EMBODIMENT

Figure 1A:
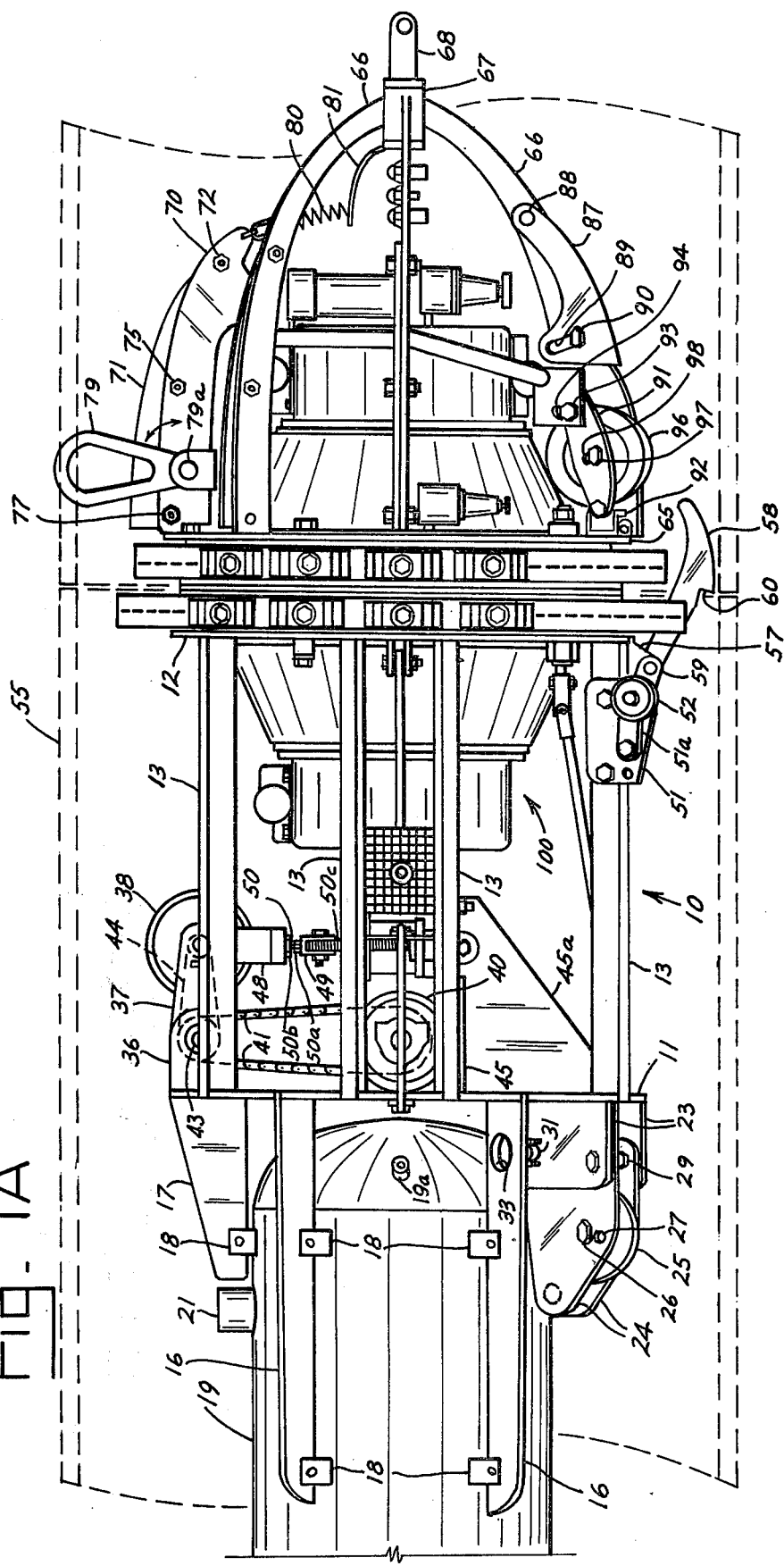
Figure 1B:
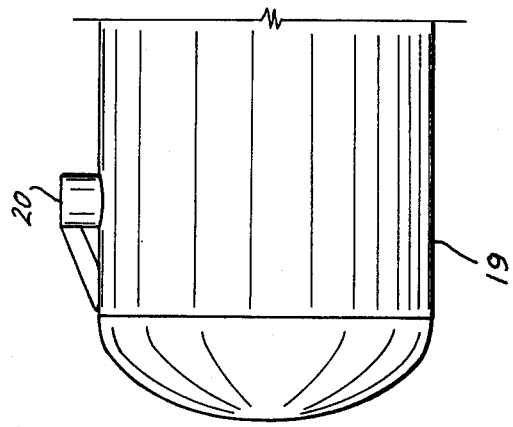

Referring now to the drawings in detail, and describing the preferred embodiment of apparatus as shown therein, the internal pipe line-up clamp apparatus is generally indicated in FIGS. 1A and 1B by reference numeral 10. The frame of the intermediate portion of the apparatus is made up of generally circular plate 11, ring 12 and longitudinal bars 13 parallel to the axis of the apparatus. The bars 13 are of rectangular cross section with their longer cross sectional dimensions disposed radially. The apparatus has four bars 13 at each side of the apparatus.

Brackets 16, 17 at the sides and top are welded to plate 11 and are connected to brackets 18 to support tank 19, tank 19 being a pressure tank for containing a quantity of pressured gas, such as compressed air. Tank 18 has fittings 20, 21 for use in filling the tank with compressed air or other pressured gas.

Figure 8:
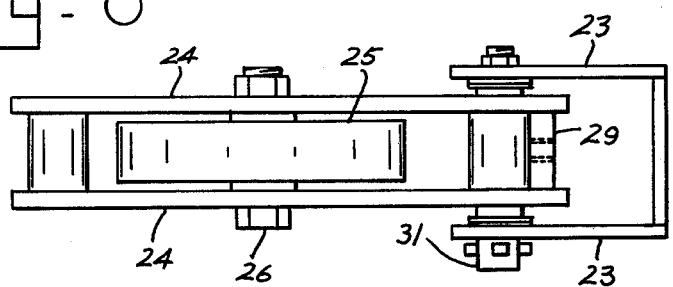
FIG. 8 is a top view of a wheel assembly employed in the apparatus shown in FIGS. 1A–1B.
Figure 9:
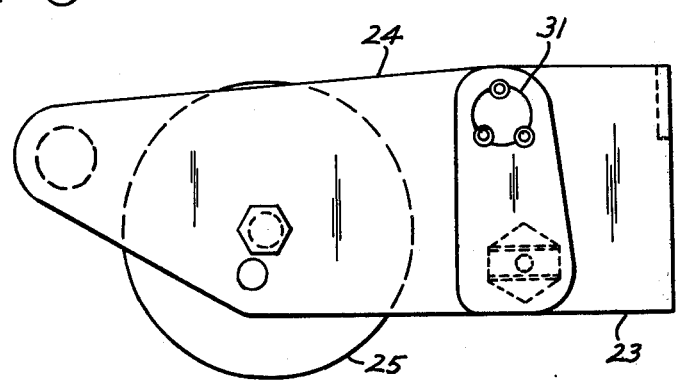
FIG. 9 is a side elevation of the apparatus shown in FIG. 8.

Two pairs of brackets 23 are welded to plate 11, a pair being disposed angularly downwardly at each side of the apparatus (see FIGS. 8 and 9). Each pair of brackets 23 carries a wheel mounting bracket assembly 24 supporting a wheel 25. The wheel 25 is disposable in two positions, the wheel being shown in the drawing in its inward position secured by an axle bolt or shaft 26 through inner holes through bracket 24, and which is also disposable through outer bracket holes 27 in an outward wheel position. Bracket assembly 24 is secured at each side to brackets 23 by a bolt 29, the connection being pivotal, and a screw 31 is provided through slots in bracket assembly 24 for fixing of the bracket 24 angle, access thereto being available through opening 33 through bracket 16.

Figure 13:
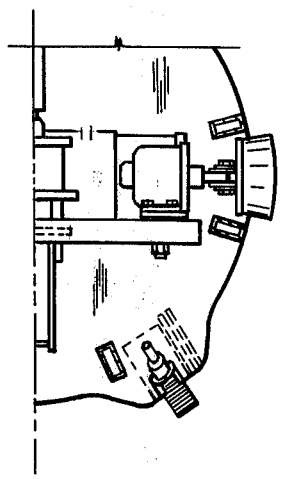
FIG. 13 is a partial cross section taken at line 13—13 of FIG. 1.

At the upper side of plate 11, opposite bracket 17, a pair of brackets 36 are provided which mount a pair of pivotal arms 37 which carry a pair of drive wheels 38. A drive motor 40 is connected by drive chain 41 to a drive sprocket mounted on shaft 43 between brackets 36, and an additional drive chain 44 being disposed between brackets 36 to drive a sprocket carried between drive wheels 38. Drive motor 40 is mounted on a platform 45 supported by gasket plates 45a. At their ends toward the forward end of the apparatus, gusset plates 45a have upstanding portion 45b to which support brackets 46 which depend downwardly from the bottom of cylinder 47 are pivotally bolted by a cross bolt 46a (see FIG. 13). Brackets 46 each have two holes 46b and 46c for receiving bolt 46a, one for disposition of cylinder 47 at a relatively lower level and one for disposition of cylinder 47 at a relatively higher level. The shaft 47a of cylinder 47 is connected by link 47b to a U-shaped bracket or yoke 48. Yoke 49 is bolted to the upper end of link 47b, and a threaded shaft 50 and lock nuts 50a, 50b provide for fine adjustment of the effective length of threaded shaft 50. Moving cylinder 47 downwardly or upwardly at holes 46b and 46 moves arms 37 and drive wheels 38 pivotally downwardly or upwardly to adjust the apparatus for use in two different sizes of the pipe 55, and adjustment of the effective length of threaded shaft 50 by adjustment of lock nuts 50a, 50b provides fine or minor adjustment to adjust the pressure of drive wheels 38 against the inner side of the pipe wall. Helical tension springs 50c at opposite sides of brackets 46 bias yoke 48 in an inward direction so that wheels 38 will be held in an inward position when cylinder 47 is not operated to drive drive wheels 38 against the wall of a pipe within which the apparatus is disposed.

Figure 6:
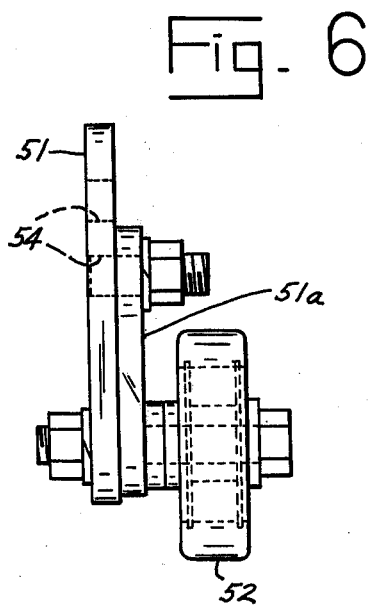
FIG. 6 is an end elevation of a locator wheel assembly used in conjunction with the apparatus shown in FIGS. 1A–1B.
Figure 7:
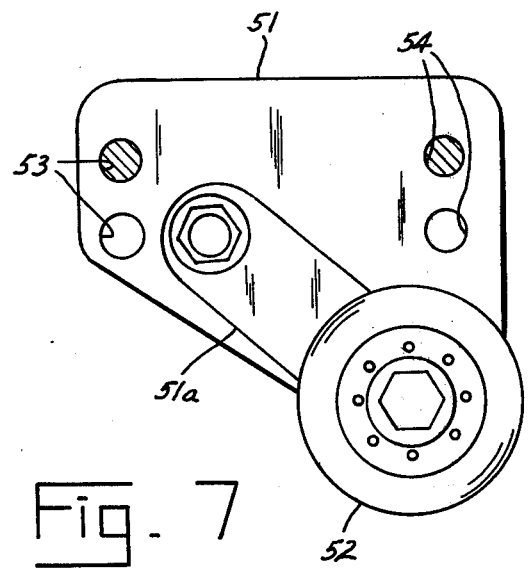
FIG. 7 is a side elevation of the apparatus shown in FIG. 6.

The bottom bar member 13 at each side of the apparatus carries a bracket 51 (see FIGS. 6 and 7). The bracket 51 carries a pivotal bar 51a supporting a locator wheel 52. As is better shown in FIG. 7 of the drawings, bracket 51 has two sets of holes 53, 54 for securing the bracket to the bar 13, so that the bracket may be mounted in an inner or an outer position.

Figure 3:
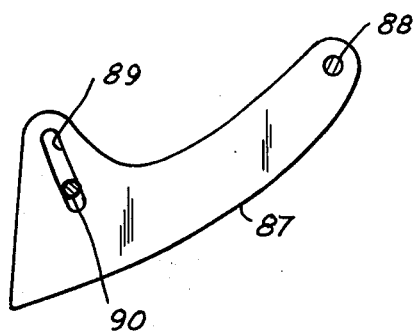
FIG. 3 is an elevation of a bottom adaptor bar use in the apparatus shown in FIGS. 1A–1B.
Figure 4:
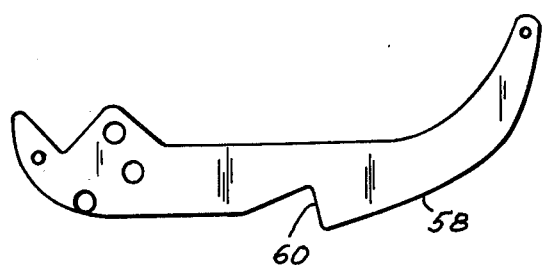
FIG. 4 is an elevation of a locator bar used in conjunction with the apparatus shown in FIGS. 1A–1B.
Figure 5:
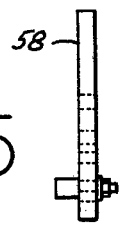
FIG. 5 is an end elevation of the apparatus shown in FIG. 4.

A bracket 57 connected to ring 12 at its lower side carries a shaped locator bar 58 (see FIGS. 3–5) which is pivotally disposed from the bracket by a connection pin or bolt 59. Locator bar 58 drags along the interior of the pipe until the pipe end is reached at which time the stepped configuration 60 locates the end of the pipe to position the apparatus.

Figure 10:
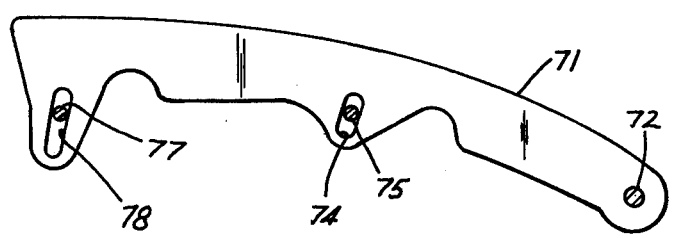
FIG. 10 is a side elevation of a guide bar employed in the apparatus of FIGS. 1A–1B.

A plate 65 facing the forward end of the apparatus supports guide bars 66 which curve inwardly toward nose fitting 67, the ends being welded to the nose fitting. A cable attachment fitting 68 is provided for attachment of a cable to draw the apparatus through the pipe if necessary. The curved forward ends of bars 66 provide for guidance of the apparatus into the end of a pipe. A plurality of the bars 66 are provided around the periphery of plate 65 and the nose fitting. To the upper bar 66 there is affixed a bracket 70 to which is secured a pivotal guide bar 71. Guide bar 71 is shown in more detail in FIG. 10 of the drawings. The front end of guide bar 71 is pivotally secured by a bolt 72. Intermediate its length, guide bar 71 has a slot 74 through which bolt 75 is secured so that the guide bar may be adjusted pivotally upwardly and downwardly. A bolt 77 through bracket 70 is disposed through a slot 78 in guide bar 71 to additionally support the position of guide bar 71. A helical tension spring 80 secured to arm 81 affixed to nose fitting 67 urges bracket 70 and guide bar 71 toward the upward interior side of pipe 45. Guide bars 71 are similarly affixed to bars 66 at other locations around the apparatus periphery. An engagement fitting 79 for lifting the apparatus is pivotally connected to the apparatus at pin 79a.

To the lower bar 66, there is pivotally affixed a guide bar 87 pivotally secured by pin or bolt 88 and adjustable in position by movement of slot 89 along bolt 90 secured to the bar 66. Therebehind, a bracket 91 is secured to bracket 92 carried by ring 65, the forward end of bracket 91 being movable between bolt holes at positions 93, 94. The axle bolt of a wheel 96 is movable between positions 97, 98. Thereby, wheel 96 may be moved to either of inner and an outer positions for two different sizes of pipe in which the apparatus is employed.

Figure 2:
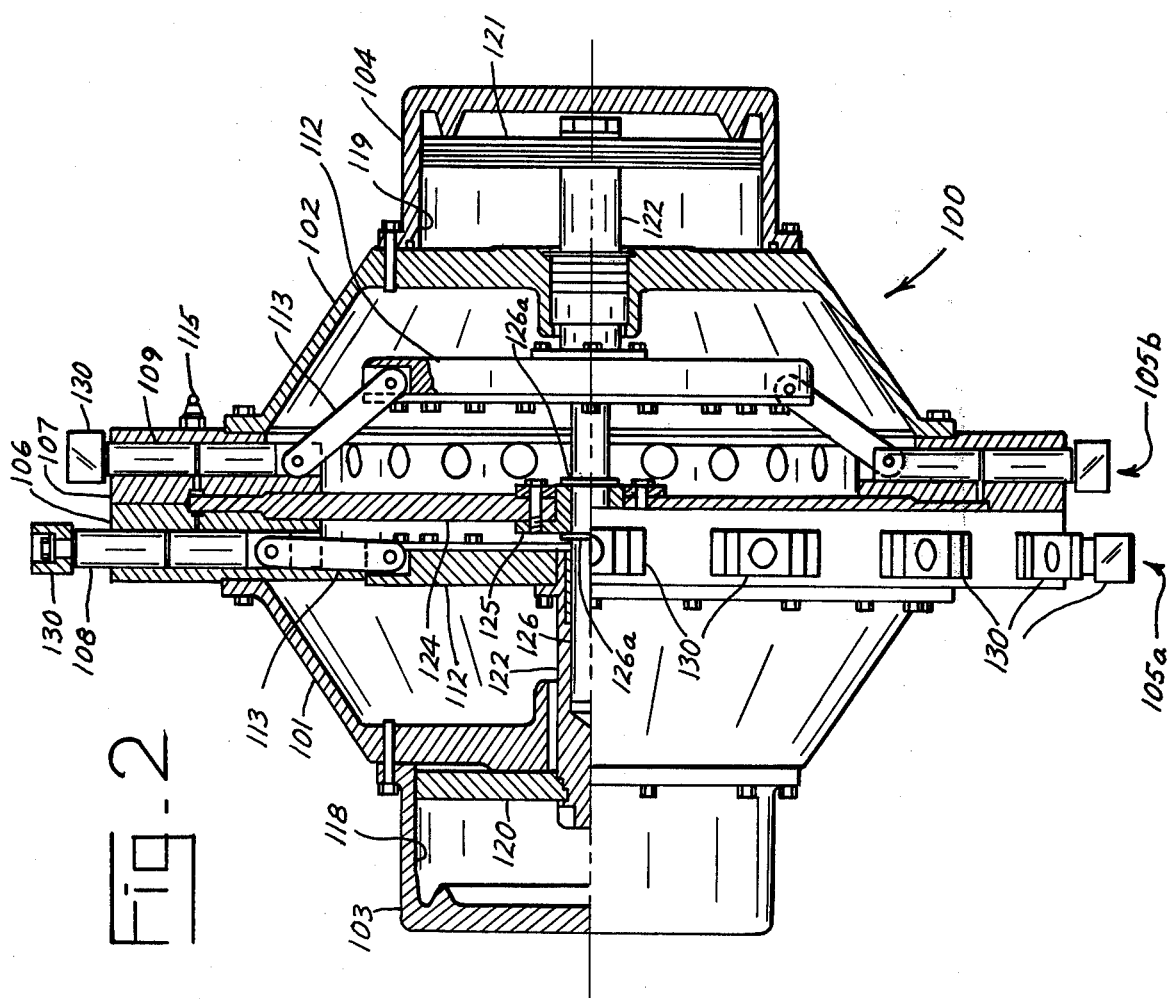
FIG. 2 is a side elevation, partly and vertical cross section, showing the drive assembly for expanding and retracting the two rings of pipe engaging shoes.

Between rings 12 and 65, a clamp shoe expansion assembly 100 is disposed, shown in FIG. 2 of the drawings. The housing for assembly 100 is made up of housing elements 101, 102 each of frustoconical form and end elements 103, 104 of closed end cylindrical form. Elements 103, 104 provide piston chambers in which pistons are disposed for driving the two rings of shoes 105a, 105b between their inner and outer positions. Rings 106, 107 each have plural circularly spaced radial bores within which the shafts 108, 109 are slidably disposed. A disc shaped fitting 112 has pivotally secured thereto a plurality of toggle bars 113 (only two shown) the outer ends of which are pivotally connected to the inner ends of the shafts 108, 109. Grease fittings 115 are provided for lubrication of the shafts 108, 109. In each of the chambers 118, 119 of housing members 103, 104, respectively, there is disposed a piston 120, 121 having a piston shaft assembly 122. A plate 124 fitted between rings 106, 107 as shown supports a central fitting 125 which supports a stabilizer shaft 126 fixed by snap pins 126a on which the hollow inner ends of shafts 122 slide. Since they are conventional and well known in the art, all of the details of the expansion assembly 100 will not be described. When either of the pistons 120, 121 is moved by suitable application of hydraulic or pneumatic pressure, the piston corresponding 120 or 121 is moved to move the thereto connected disc 112 which causes inward or outward movement of the set or ring 105a or 105b of shoes 130 secured to the respective shafts 108, 109 of each set.

Figure 11:
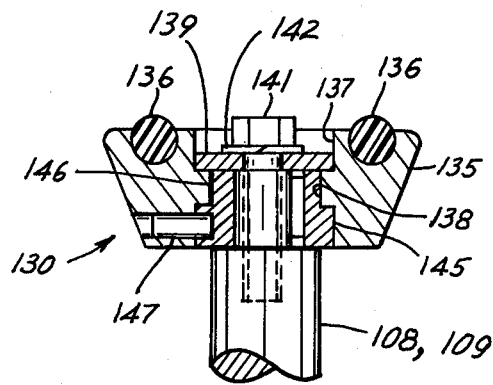
FIG. 11 is a vertical cross section of a pipe engaging shoe employed with the apparatus, showing the shoe in a relatively inward position.
Figure 12:
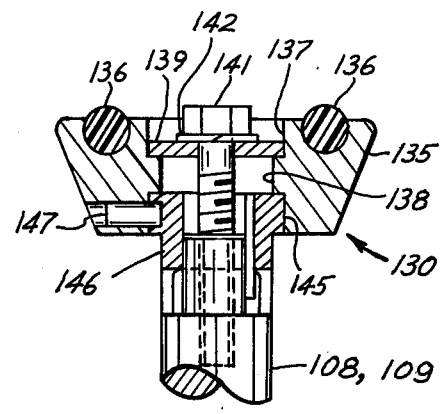
FIG. 12 is similar to FIG. 11, showing the shoe in a relatively outward position.

The shoes 130 are shown in more detail in FIGS. 11 and 12 of the drawings. The shoes 130 are of uniform widths as indicated in FIG. 2. Each shoe comprises a body 135 having pipe wall contact bars 136 fixed into suitable recesses at their outer faces. Each shoe has a passage 137 therethrough which is reduced at its central portion 138. A washer 139 is fitted in the upper part of opening 137 and a screw 141 having lock washer 142 therearound is inserted through the washer. A fitting 145 is disposed in the lower part of each opening 137. The fitting 145 may be disposed in either of reversed positions. In FIG. 11, fitting 145 is shown with its smaller end 146 disposed upwardly while in FIG. 12, fitting 145 is shown with its smaller end 146 disposed downwardly. This reversal of position of the fittings 145 provides that the shoes may be at either of two length positions with respect to the outer ends of the shafts 108, 109. The fittings 145 are held in place by spring pins 147 disposed in suitable openings through the sides of the bodies 135. As shown, the shafts 108, 109 are reduced at 159 and are tapped at 160 to receive the screws 141.

Referring again to FIGS. 6-8 of the drawings, and also to FIGS. 14-15, there is shown in FIGS. 14-15 an alternative structure to the structure shown in FIGS. 6-7. In the FIG. 6-7 form, the alignment of bar 51a and locator wheel 52 is fixed by frictional engagement of screw 516, which may not be sufficient to hold arm 51a and locator arm 52 in alignment. In the FIG. 14-15 form, the bracket 170 has two sets of holes 171, 172, corresponding respectively to holes 53, 54 of FIGS. 6-7. A slot 174 receives the shank of bolt 175, which extends also through sleeve 176. Bearing 177 of wheel 52 is held disposed between inner bushing 178 and outer bushing 179 by split ring 52a. Washer 180 is disposed beneath nut 181 which is screwed onto the end of bolt 175.

A generally triangular adjusting wedge 183 has slot 184 through which screw 185 is disposed, the end of screw 185 being screwed into a tapped opening through bracket plate 170. The angular side 186 of wedge 183 is disposed against a side of the head of bolt 175. The engagement of wedge side 186 against the head of bolt 175 prevents the bolt 175 from being moved upward in slot 174, whereby locator wheel 52 will be positively maintained aligned against the interior wall of a pipe in which the apparatus is disposed for use. The radial position of wheel 52 may, of course, be adjusted, the position of wedge 183 being adjusted correspondingly.

It will be understood that the apparatus is of adjustable size to fit pipes of two different nominal sizes. All of the pipe engaging elements of the internal pipe clamp have adjustable positions so that they may be moved inwardly or outwardly depending on the size of pipe to be welded. The drive assembly is adjustable, as are all wheel supports for the apparatus. The guide elements at the front end of the apparatus are similarly adjustable depending upon the size of pipe to be handled.

The pneumatically operated equipment is connected to tank 19 at outlet fitting 19a by suitable conduits (not shown) to be operated by the pressured gas contained therein.

While a preferred embodiment of apparatus according to the invention has been described and shown in the drawings, many modifications thereof may be made by a person skilled in the art without departing from the spirit of the invention, and it is intended to protect by Letters Patent all forms of the invention falling within the scope of the following claims.

We claim:

1. Pipe line-up clamp apparatus, comprising a pair of outwardly facing circularly disposed axially spaced rings of clamp means adapted to be separately releasably clamped within abutted pipe ends to enable welding of the pipe ends together, idler wheel means supporting said apparatus for rolling movement through a pipe when said clamp means are in released conditions, drive wheel means adapted to engage the interior of a pipe and means for driving said drive wheel means, guide means supported at the forward end of said apparatus for guiding said apparatus in the end of a pipe, said clamp means comprising pipe wall engaging shoes disposed at the outer ends of radially reciprocably movable shafts, and including adapter fitting means disposed between said shafts and shoes which are reversible in position to alter the radially outward dispositions of said shoes to accommodate two different pipe diameters, said idler wheel means, and guide means and drive wheel means each being adjustably supported to fit pipes of said two different diameters whereby a single pipe line-up clamp apparatus may be employed for welding abutted ends of pipes of said two different diameters.

2. The combination of claim 1, including movable support means for said means for driving said drive wheel means having radially inward and radially outward positions to accommodate said driving means to said two different pipe diameters.

3. The combination of claim 1, said idler wheel means being supported by bracket means pivotally movable radially inward and outward, said guide means comprising plural circularly spaced outwardly curved bar means pivotally secured at their forward ends and being pivotally movable radially inward and outward at their rearward ends.

4. The combination of claim 3, including movable support means for said means for driving said drive wheel means having radially inward and radially outward positions to accommodate said driving means to said two different pipe diameters.

5. The combination of claim 4, said means for driving said drive wheel means comprising a fluid motor.

6. The combination of claim 5, including means supported by said apparatus for engaging and thereby locating the apparatus with respect to the end of a pipe within which the apparatus is disposed.

7. Internal pipe line up clamp apparatus for use in clamping pipe sections disposed end-to-end for welding, comprising a first circularly disposed plurality of clamp means for clamping within the end of one pipe section, a second circularly disposed plurality of clamp means for clamping within the adjacent end of another pipe section, carrier means for selectively supporting said clamp means concentrically within pipe sections of two different diameters, said carrier means comprising a frame structure having wheel means adjustably supported thereby, said wheel means including at least one locator wheel, each said locator wheel being rotatively supported by bracket means adjustable to engage said locator wheel with the inner walls of pipes of both of said two different diameters, said locator wheel being carried at one end of an arm fixedly yet pivotally adjustably connected to said bracket means, whereby said carrier means may support said clamp means concentrically within pipe sections of said two different diameters.

8. Internal pipe line up clamp apparatus for use in clamping pipe sections disposed end-to-end for welding, comprising a first circularly disposed plurality of clamp means for clamping within the end of one pipe section, a second circularly disposed plurality of clamp means for clamping within the adjacent end of another pipe section, carrier means for selectively supporting said clamp means concentrically within pipe sections of two different diameters, said carrier means comprising a frame structure having wheel means adjustably supported thereby, said wheel means including at least one locator wheel, each said locator wheel being rotatively supported by bracket means adjustable to engage said locator wheel with the inner walls of pipes of both of said two different diameters, said locator wheel being supported by axle means adjustably fixed in slot means of said bracket means whereby said wheel means may be adjusted as to its spacing from the axis of a pipe in which said apparatus is disposed for use, whereby said carrier means may support said clamp means concentrically within pipe sections of said two different diameters.

9. The combination of claim 8, including wedge means adjustably fixed to said bracket means in engagement with the radially inner side of said axle means to prevent unwanted radially inward movements of said axle means and locator wheel, whereby when said locator wheel is fixed in a position against the inner wall of a pipe in which said apparatus is disposed for use said locator wheel will be maintained in such position.

10. The combination of claim 9, wherein said two different diameters differ by approximately two inches.

11. The combination of claim 7, including guide elements carried at the forward end of said apparatus for guiding said apparatus into and through sections of pipe, said guide elements being adjustable to fit pipe sections of both of said two different diameters.

12. The combination of claim 8, including guide elements carried at the forward end of said apparatus for guiding said apparatus into and through sections of pipe, said guide elements being adjustable to fit pipe sections of both of said two different diameters.

* * * * *